(12) United States Patent
Gordon et al.

(10) Patent No.: US 7,874,547 B2
(45) Date of Patent: Jan. 25, 2011

(54) CONTROL FOR EVAPORATIVE COOLING APPARATUS WITH CONVEX FLARE TO PRODUCE HELICAL AIR FLOW

(76) Inventors: Larry R. Gordon, 19631 E. Camina Plata, Queen Creek, AZ (US) 85242; Jon E. Jelen, 2215 S. Johnson Cir., Mesa, AZ (US) 85202

( * ) Notice: Subject to any disclaimer, the term of this patent is extended or adjusted under 35 U.S.C. 154(b) by 826 days.

(21) Appl. No.: 11/825,125

(22) Filed: Jul. 3, 2007

(65) Prior Publication Data

US 2008/0042303 A1 Feb. 21, 2008

Related U.S. Application Data

(63) Continuation-in-part of application No. 11/199,810, filed on Aug. 9, 2005, now abandoned, which is a continuation-in-part of application No. 10/658,436, filed on Sep. 8, 2003, now abandoned, which is a continuation-in-part of application No. 09/997,517, filed on Nov. 29, 2001, now Pat. No. 6,637,729.

(51) Int. Cl.
*B01F 3/04* (2006.01)

(52) U.S. Cl. .......................... 261/30; 261/79.2; 261/84; 415/207; 415/209.4

(58) Field of Classification Search ................... 261/26, 261/28, 30, 79.2, 84, 89, 130, DIG. 3, DIG. 43; 415/182.1, 207, 208.2, 209.1, 209.4, 210.1, 415/211.2, 212.1
See application file for complete search history.

(56) References Cited

U.S. PATENT DOCUMENTS

| | | | | | |
|---|---|---|---|---|---|
| 2,615,301 | A | * | 10/1952 | Smith | 60/804 |
| 4,443,387 | A | * | 4/1984 | Gordon | 261/30 |
| 4,693,852 | A | * | 9/1987 | Gordon | 261/30 |
| 6,578,828 | B2 | * | 6/2003 | Terrell et al. | 261/30 |
| 6,637,729 | B2 | * | 10/2003 | Gordon | 261/26 |
| 7,588,419 | B2 | * | 9/2009 | Hong et al. | 415/211.2 |
| 2002/0112673 | A1 | * | 8/2002 | Lorton et al. | 119/437 |

* cited by examiner

*Primary Examiner*—Scott Bushey
(74) *Attorney, Agent, or Firm*—Tod R. Nissle, P.C.

(57) ABSTRACT

Reduced size evaporative cooling apparatus utilizes a convex flare at the outlet of the apparatus to control air flow exiting the apparatus and cause air to flow along a helical path that produces an updraft off the ground below the apparatus.

1 Claim, 16 Drawing Sheets

FIG. 5
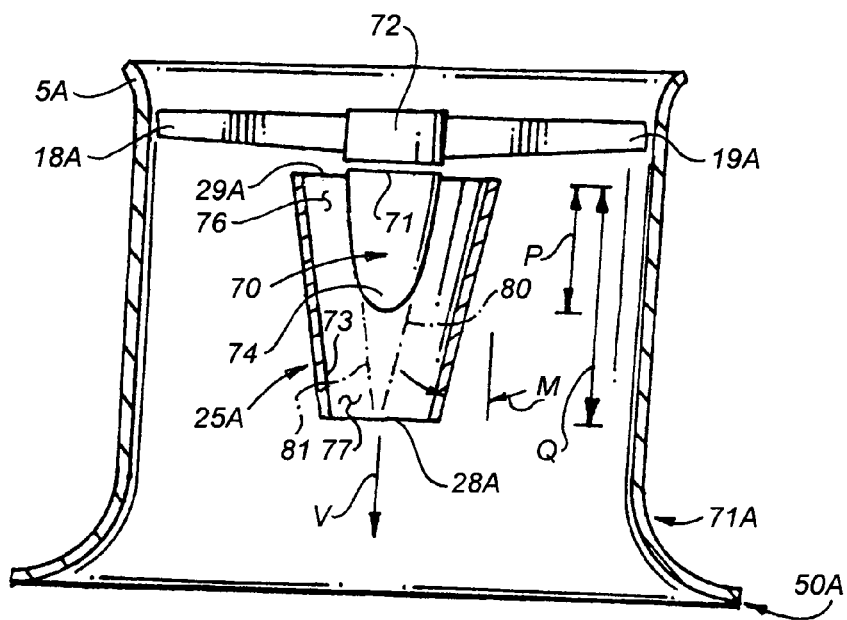
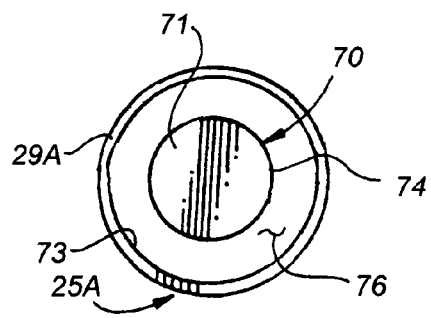
FIG. 6

CONTROL FOR EVAPORATIVE COOLING APPARATUS WITH CONVEX FLARE TO PRODUCE HELICAL AIR FLOW

This application is a continuation-in-part application of Ser. No. 11/199,810, filed Aug. 9, 2005, now abandoned, which is a continuation-in-part application of Ser. No. 10/658,436, filed Sep. 8, 2003, now abandoned, which is a continuation-in-part application of Ser. No. 09/997,517, filed Nov. 29, 2001, now U.S. Pat. No. 6,637,729.

This invention pertains to apparatus for controlling the activation and deactivation of equipment for cooling air.

In a further respect, the invention pertains to apparatus for preventing the cycling on and off of air conditioning apparatus set to be activated at a selected temperature.

In another respect, the invention pertains to apparatus of the type described which determines when to activate air conditioning equipment by comparing short term and long term ambient air temperatures.

In still a further respect, the invention pertains to apparatus of the type described which reduces the power consumption require to operate the equipment.

The utilization of compressor-driven and evaporative-cooler driven air conditioning equipment is well known in the art. One kind of evaporative cooler equipment is set forth in U.S. Pat. Nos. 4,443,387 and 4,693,853. These patents describe evaporative cooler equipment for maintaining a relatively constant ambient air temperature around dairy cows. The evaporative cooling equipment includes a plurality of spray nozzles and a fan which directs an air flow with water mist emitted from the nozzles toward the cows. The equipment also includes a control unit which activates the equipment when the ambient air temperature reaches a selected control temperature in the morning (or other time of day) and which deactivates the equipment when the ambient air temperatures falls to an associated control temperature in the afternoon (or other time of day).

While such evaporative cooling equipment has long been successfully used to maintain a selected ambient temperature around cows, one long standing "cycling" problem associated with the equipment occurs when the equipment is activated in the morning and deactivated in the afternoon and evening. The equipment is activated in the morning and deactivated in the evening because the night time ambient air temperatures are low enough that evaporative cooling is not required. The cycling problem consists of the tendency of the equipment to "hunt" or "search" for the appropriate selected control temperature due to small variations in ambient air temperature when the equipment is turned on or off. For example, if the evaporative cooling equipment is set to be activated at a selected "turn-on" control temperature of 80° F., the controller turns on the equipment when sensors monitored by the controller sense a temperature of 80° F. If, however, the sensors within a few minutes then sense a temperature of 76° F. (or less) then the controller turns off the equipment (assuming that the equipment is set with a hysteresis of 3 degrees F. or less).

As soon as the sensors again detect an ambient air temperature of 80° F., the controller again turns on the equipment. Ambient air temperatures can vary due to changes in the humidity, to breezes, to clouds moving over the sun, etc. Another reason is that as soon as the fans turn on, there is typically a drop in air temperature due to the increased air circulation and movement. This cycling on and off can occur even if the controller is programmed with a few degrees of hysteresis.

It is particularly important to keep the equipment operational for as long as necessary prior to turning the equipment off in the afternoon. If the selected turn-off control temperature is 76° F., then when the temperature when taken each minute goes 76°-75°-76°-75°-76°-76°-76°-76°-77°-77°-76°-77°-76°-76°-77°-76°-75°-75°-76°-75°-75°-75°-75°-74° F., it is desirable to not have the equipment turn off simply because a temperature of 75° or 76° F. is sensed.

Another problem associated with prior art evaporative cooling apparatus of the type described is that such apparatus initially utilized a one-half horsepower motor to power the fan. Customers often now demand a five horsepower or larger motor. Consequently, the cost of electricity has become an issue.

Accordingly, it would be highly desirable to provide improved evaporative cooling apparatus which would avoid cycling when the apparatus is turned on, and avoid prolonged operation when it is time to shut down the equipment.

Therefore, it is a principal object of the invention to provide improved air conditioning apparatus.

A further object of the instant invention is to provide improved evaporative cooling apparatus which avoids or minimizes "on-off" cycling when the apparatus is being turned on or off at selected ambient air temperatures.

Another object of the invention is to provide improved evaporative cooling apparatus which reduces the cost of electricity required to power the apparatus.

These and other, further and more specific objects and advantages of the invention will be apparent to those skilled in the art from the following detailed description thereof, taken in conjunction with the drawings, in which:

FIG. 5 is a side section elevation view illustrating an alternate embodiment of the invention;

FIG. 6 is a top view of a portion illustrating construction details of the embodiment of the invention of FIG. 5;

Figure 1:
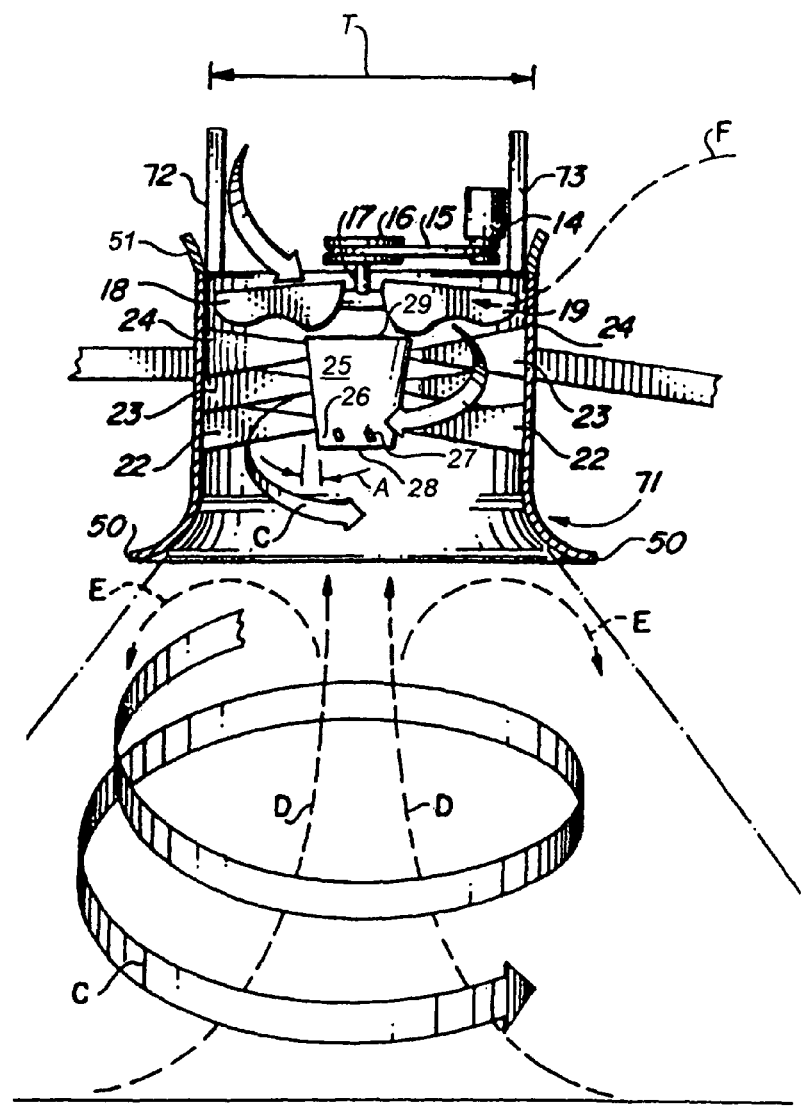
FIG. 1 is a graph illustrating light temperature averages and heavy temperature averages generated in accordance with the principles of the invention.

Briefly, in accordance with the invention, provided is an improved evaporative cooling apparatus. The apparatus includes at least one nozzle for emitting water droplets above the ground; a fan for directing the water droplets in a selected direction; a pressure generating system for directing water through the nozzle; and, a control unit for generating an activation signal for activating the fan and the pressure generating system to emit water droplets from the nozzle and direct the water droplets in the selected direction when the ambient air temperature reaches a selected control temperature. The control unit includes a sensor for, when the ambient air temperature is less than the selected control temperature, sensing the ambient air temperature at selected time intervals; a memory for recording the ambient air temperatures sensed at the selected time intervals by the sensor; and, an activation signal generation system. The activation signal generation system periodically repeatedly calculates at selected times of day the average ambient air temperature from the ambient air temperatures taken during a first time period to determine light temperature averages; and, a second time period to determine heavy temperature averages. The second time period is longer than the first time period. The activation signal generation system also generates the activation signal when the light temperature average is greater than the heavy temperature average, and the light temperature average reaches the selected control or "set point" temperature.

In another embodiment of the invention, provided is an improved evaporative cooling apparatus. The apparatus includes a generally cylindrical hollow housing having an inner diameter greater than thirty inches; at least one nozzle mounted in the housing for emitting water droplets above the ground; a fan mounted in the housing and having a horsepower greater than two horsepower for directing the air and water droplets in a selected direction; a pressure generating unit for directing water through the nozzle; and, control means for generating an activation signal for activating the pressure generating unit and the fan to emit water droplets from the nozzle and direct the water droplets in the selected direction when the ambient air temperature reaches a selected control temperature.

In a further embodiment of the invention, provided is an evaporative cooling unit to be positioned in ambient air. The unit includes a housing having a top and a bottom, the housing circumscribing a central area; a fan mounted at the top of the housing to produce a flow of air into the housing; a support surface mounted in the central area and spaced apart from the housing; a plurality of canted vanes extending from the support surface to the housing to guide the flow or air along a helical path through the housing; and, an arcuate lip mounted on the bottom of the housing and having an inner surface shaped and dimensioned to permit the flow of air to expand outwardly tangentially along the inner surface over a generally linear path of travel while protecting the flow of air from an inflow of ambient air while the flow of air moves over the inner surface.

In still another embodiment of the invention, provided is an improved evaporative cooling unit to be positioned in ambient air and including a cylindrical housing having a height in the range of two to thirty-four inches; a diameter in the range of fifteen to thirty-six inches; a top; and a bottom. The housing circumscribes a central area. The unit also includes a fan mounted at the top of the housing to produce a flow of air into the housing; a support surface mounted in the central area and spaced apart from the housing; a pair of tiers of canted vanes extending from the support surface to the housing to guide the flow of air along a helical path through the housing; and, a flare on the bottom of the housing. The flare has a variable diameter and a height less than five inches and comprises an inner convex surface expanding outwardly and shaped and dimensioned to permit the flow of air to expand helically outwardly tangentially over the inner surface and downwardly away from the flare over a generally linear path of travel such that an updraft is formed below the flare and within the path of travel. The radius of curvature of the flare decreases as the inner convex surface outwardly expands.

Turning now to the drawings, which depict the presently preferred embodiments of the invention for the purpose of illustrating the practice thereof and not by way of limitation of the scope of the invention, the apparatus of FIG. 1 includes hollow cylindrical housing 71 attached to frame members 72 and 73. Motor 14 attached to frame member 73 rotates belt 15 to turn pulley 16. Shaft 17 carries fan blades 18, 19 which rotate simultaneously will pulley 16. Shaft 17 is rotatably supported by a frame member (not shown) connected to member 73. Inverted hollow conical member 25 is supported inside housing 71 by tiers 22, 23, 24 of radially extending members. Nozzles 27 are mounted on member 22 and extend inwardly and outwardly from member 25. Conduits (not shown) deliver water to nozzles 27, typically at a pressure in the range of 150 to 400 psi. Each nozzle typically produces droplets in the range of forty to one hundred micron droplets at a pressure of 300 psi. The droplet size can, however, vary as desired.

Fan blades 18 and 19 draw in air in the direction of arrow F and produce a downwardly directed flow of air which comes off the blades at an angle which is generally in the range of about 20 degrees to 60 degrees to the vertical. Arrows C indicate the downward expanding spiral path generally followed by air which is directed between housing 71 and member 25. Fan blades 18 and 19 also direct air into circular opening 29 of member 25, through member 25, and out the circular opening 28 of member 25. Since the cross-sectional area of member 25 decreases as the distance away from blades 18 and 19 increases, member 25 can function like a venturi so that the velocity of air exiting member 25 through opening 28 is greater than the velocity of air entering member 25 through opening 29. Even if the air velocity is not increased, tapered member 25 tends to insure that air flows outwardly through the bottom opening 28 toward the ground. When fan blades 18 and 19 begin to turn, an updraft indicated by arrows D and E can tend to result. Air exiting member 25 downwardly through circular opening 28 tends to interdict and prevent the flow of air in the direction of arrows D.

The angle or slope of the conical side 26 of hollow member 25 in FIG. 1 with respect to the vertical is indicated by arrows A. This slope is preferably in the range of five degrees to thirty degrees, preferably in the range of ten degrees to twenty degrees. If the slope is too great, then the diameter of opening 28 becomes to small and impedes the flow of air through opening 28. If the slope is too small, then the diameter of opening 28 becomes too large, and it is less likely that air will continually flow out through opening 28 toward the ground.

The conical shape of hollow member 25 is important in the practice of the invention because it helps to insure that air will continually flow downwardly from fan blades 18, 19 toward the ground and will not be drawn upwardly away from the ground in the direction of arrows D into housing 71. This is accomplished by insuring that the top of conical member 25 is wide enough to capture some of the downward flow of air produced by the inner end portions of blades 18, 19. The inner end portions of blades 18, 19 are those portions of blades 18, 19 that are closest to shaft 17. When the lower end of member 25 has a smaller cross sectional area than the upper end of member 25, air which travels downwardly from the inner end portions of blades 18, 19 through hollow member 25 tends to be accelerated because of the venturi effect produced. The acceleration of air through the lower end of member 25 helps to stabilize the flow of air through the central portion of housing 71 where the air flow is normally slower, less stable, and more susceptible to being disturbed and reversed by forces tending to draw air upwardly away from the ground and into housing 71. The diameter of the upper end of member 25 is typically great enough to cause air flowing off the inner five percent to twenty percent of the length of each blade 18, 19 to flow into and through member 25.

In use, the apparatus of FIG. 1 is normally positioned such that lower lip 50 is approximately seven to ten feet, preferably eight to nine feet, above the ground. One objective in determining the heigh of lower lip 50 above the ground is to insure that a cow or cows standing beneath the apparatus is moist, but not so moist that water drips off the cow onto the ground. It is desirable to prevent the ground from becoming wet. Water injected into air passing through housing 11 and member 25 is, by the time the air has traveled to within approximately one foot of the ground 51, has evaporated sufficiently to remain substantially airborne.

The inner diameter, indicated by arrows T, of cylindrical housing 71 is presently about sixty-one inches, and is preferably in the range of thirty inches to one hundred inches, most preferably fifty to seventy-two inches.

Preferably, the distance between the distal ends of blades 18, 19 and the inner wall of housing 71 adjacent the distal ends of blades 18, 19 is small and is in the range of about one-eighth to one inch, preferably about one-fourth to one-half of an inch. Motor 29 presently has a horsepower in the range of about one-half to twelve horsepower, preferably two to seven and one-half horsepower. The use of a lower horsepower motor is practical because of the long length tip-to-tip of blades 18, 19. This tip-to-tip length is in the range of about thirty to one hundred inches, preferably forty to seventy-five inches, most preferably forty-eight to seventy-two inches.

The tip-to-tip length of blades 18, 19 is slightly less than the inner diameter T of housing 71 and therefore generally equals the diameter of the housing 71 in which blades 18, 19 rotate. Since the inner end of each blade 18, 19 is attached to a hub which is mounted on shaft 17, the actual length of each blade is something less than the radius of the circular area in which blades 18, 19 rotate. For example, the length of a blade 18, 19 may only be about 70% to 90% of the radius of the circular area.

The apparatus of FIG. 1 is turned on at a selected "turn-on" control temperature and is turned off at a selected "turn-off" control temperature.

Figure 2:
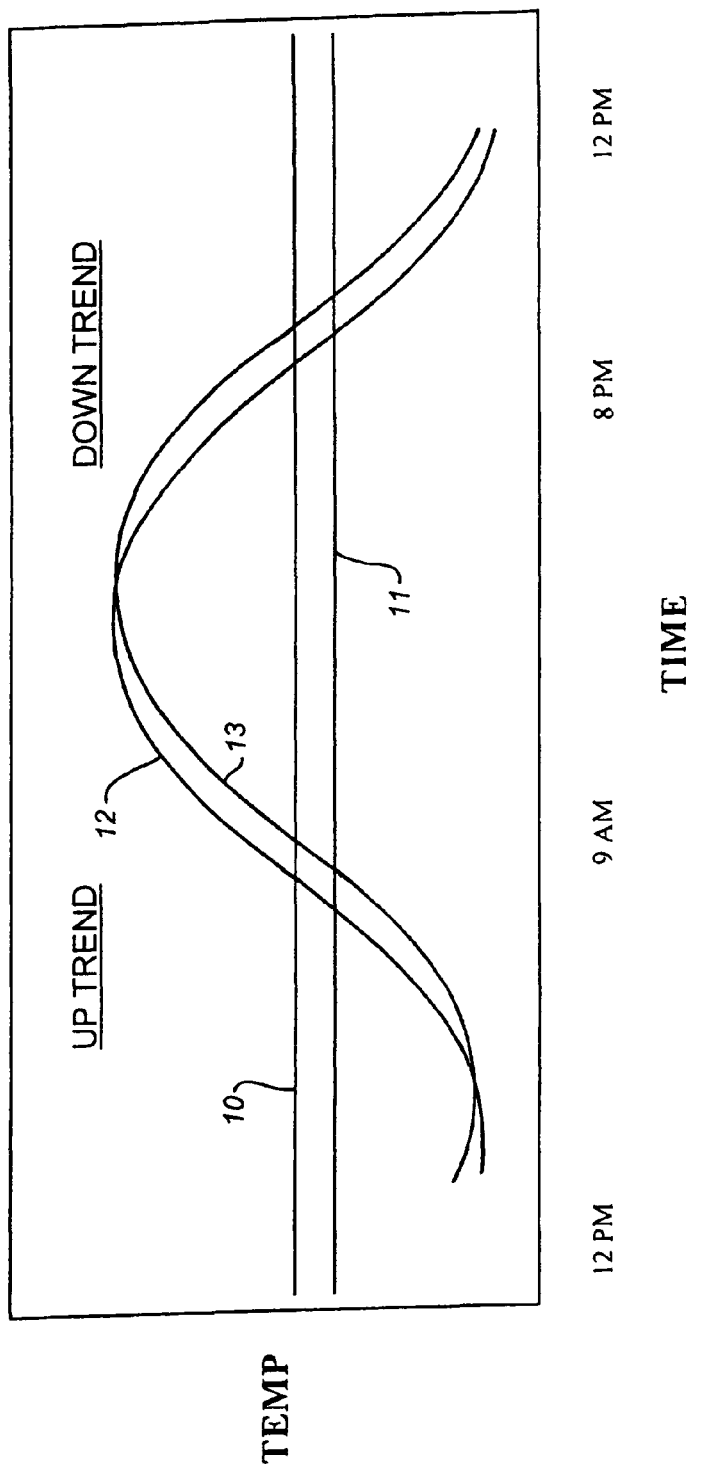
FIG. 2 is a side section view illustrating evaporative cooling apparatus constructed in accordance with the principles of the invention.

The graph of FIG. 2 illustrates a selected "turn-on" control temperature of 80° F. (line 10) and a selected "turn-off" control temperature of 76° F. (line 11), along with generally bell-shaped line 12 illustrating the light or short temperature averages and generally bell-shaped line 13 illustrating heavy or long temperature averages. On the left hand side ("UP TREND") of the graph of FIG. 1, the heavy temperature averages are generally less than the light temperature averages. On the right hand side ("DOWN TREND") of the graph of FIG. 1, the light temperature averages are generally less than the light temperature averages.

While the time period utilized to determine a light temperature average can vary as desired, at any given time of day, a light temperature average is calculated utilizing one or more measurements of the ambient temperature which have been made during a preceding selected time period. The length of this time period can vary as desired, but presently is from one second to thirty minutes, preferably one to fifteen minutes. The ambient temperature can be the temperature out-of-doors or indoors, but is presently preferably the ambient out-of-doors temperature. By way of example, if the light temperature average is calculated every minute by averaging the temperature readings made at one minute intervals during the prior five minutes, the following table provides examples of the light temperature average during a fifteen minute period beginning at 7:00 in the morning.

TABLE I

| Light Temperature Averages Each Calculated For Prior Five Minutes | | |
|---|---|---|
| Time of Day | Ambient Temp. ° F. | Light Temp. Average ° F. |
| 0700 | 68 | — |
| 0701 | 68 | — |
| 0702 | 68 | — |
| 0703 | 68 | — |
| 0704 | 69 | 68.2 |
| 0705 | 69 | 68.4 |
| 0706 | 69 | 68.6 |
| 0707 | 68 | 68.6 |
| 0708 | 68 | 68.6 |
| 0709 | 69 | 68.6 |
| 0710 | 69 | 68.6 |
| 0711 | 69 | 68.6 |
| 0712 | 70 | 69.0 |
| 0713 | 71 | 69.6 |
| 0714 | 72 | 70.2 |

Another procedure for calculating the light temperature average comprises taking multiple temperature readings during each minute (i.e., taking a reading each second, every ten seconds, etc. during a sixty second period of time) and then calculating an average temperature for that minute. Consequently, an average temperature is calculated for each minute, producing an average minute temperature. Therefore, an "average minute temperature" is calculated for each minute 0700, for 0701, for 0702, etc. Since the light temperature average is determined every minute, the light temperature average corresponds to the average minute temperature.

Or, if the light temperature average is calculated every five minutes, then each time the light temperature average is calculated, the preceding five average minute temperatures are added together and divided by five to determine the light temperature average. For example, at 0705 the average minute temperatures for 0700, 0701, 0702, 0703, and 0704 are added together and divided by five to determine the light temperature average at 0705. At 0710 the average minute temperatures for 0705, 0706, 0707, 0708, and 0709 are added together and divided by five to determine the light temperature average at 0710. And so on.

What is important in the practice of the invention is that some method be selected to calculate the light temperature average during a period of time less than the period of time utilized to calculate the heavy temperature average. The period of time during which the light temperature average is calculated is typically from about one second to thirty minutes. One of the procedures noted above can be utilized, as can any other desired procedure which calculates the light temperature average during the selected period of time.

While the time period utilized to determine a heavy temperature average can vary as desired, at any given time of day, a heavy temperature average is calculated utilizing one or more measurements of the ambient temperature which have been during a selected preceding time period. This time period can vary as desired but is usually in the range of from fifteen to three hundred sixty minutes, preferably from sixty minutes to one hundred twenty minutes. The heavy temperature average always covers a greater period of time than the light temperature average. The ambient temperature can be the temperature out-of-doors or indoors, but is presently preferably the ambient out-of-doors temperature. By way of example, if the heavy temperature average is calculated by (1) taking the ambient temperature each minute during fifteen consecutive minutes comprising a "block" of time, (2) averaging the fifteen readings in the block to obtain a block average value, (3) repeating the procedure of (1) and (2) for the next consecutive seven block (where each block is fifteen minutes long and includes fifteen readings) to obtain seven more block average values, (4) averaging the eight block average values obtained during the previous two hours to obtain a first heavy temperature average. Fifteen minutes after the first heavy temperature average is obtained, a new heavy temperature average is calculated by averaging together the eight most recent block average values obtained, which recent block average values were obtained during the prior two hour period. Consequently, each fifteen minutes a new heavy average is obtained using only the eight most recent block averages.

The following Table II provides examples of the heavy temperature average calculated during a thirty minute period beginning at 7:00 in the morning. In Table II, is it assumed that at 0700 the eight previous block averages were 60, 60, 61, 62, 64, 66, 67, and 68 degrees F., for a heavy average at 0700 equal to 63.5 degrees F. Each block average is for a fifteen minute period and is obtained by adding together fifteen readings taken during the fifteen minute period. The fifteen readings are taken at one minute intervals.

TABLE II

Heavy Temperature Averages Each Calculated For Prior Thirty Minutes

| Time of Day | Ambient Temp. ° F. | Heavy Temp. ° F. |
|---|---|---|
| 0700 | 68 | 63.5 |
| 0701 | 68 | (63.5) |
| 0702 | 68 | (63.5) |
| 0703 | 68 | (63.5) |
| 0704 | 68 | (63.5) |
| 0705 | 68 | (63.5) |
| 0706 | 68 | (63.5) |
| 0707 | 68 | (63.5) |
| 0708 | 68 | (63.5) |
| 0709 | 68 | (63.5) |
| 0710 | 69 | (63.5) |
| 0711 | 69 | (63.5) |
| 0712 | 69 | (63.5) |
| 0713 | 69 | (63.5) |
| 0714 | 69 | (63.5) |
| 0715 | 70 | 64.6 |
| 0716 | 70 | (64.6) |
| 0717 | 70 | (64.6) |
| 0718 | 70 | (64.6) |
| 0719 | 70 | (64.6) |
| 0720 | 71 | (64.6) |
| 0721 | 71 | (64.6) |
| 0722 | 72 | (64.6) |
| 0723 | 72 | (64.6) |
| 0724 | 72 | (64.6) |
| 0725 | 72 | (64.6) |
| 0726 | 73 | (64.6) |
| 0727 | 74 | (64.6) |
| 0728 | 75 | (64.6) |
| 0729 | 75 | (64.6) |
| 0730 | 75 | 66.08 |

Another procedure for calculating the heavy temperature average comprises first taking multiple temperature readings during each minute (i.e., taking a reading each second, every ten seconds, etc. during a sixty second period of time) and then calculating an average temperature for that minute. Consequently, an average temperature is calculated for each minute, producing an average minute temperature. Therefore, an "average minute temperature" would be calculated for 0700, for 0701, for 0702, etc. The heavy temperature average is then calculated by calculating "blocks" of average temperature minutes for each of eight consecutive fifteen minute periods, and then averaging together the eight blocks. For example, if the heavy temperature average is to be determined over a period of time equal to one hundred and twenty minutes, the heavy temperature average is determined by adding together the average temperature for each of eight consecutive fifteen minute blocks. The average temperature for first fifteen minute block is calculated by adding together the average minute temperatures for 0700, 0701, 0702, 0703, 0704, 0705, 0706, 0707, 0708, 0709, 0710, 0711, 0712, 0713, 0714 and dividing by fifteen. The average temperature for the second fifteen minute block is calculated by adding together the average minute temperatures for 0715, 0716, 0717, 0718, 0719, 0720, 0721, 0722, 0723, 0724, 0725, 0726, 0727, 0728, and dividing by fifteen. And so on. Once the average temperature for eight consecutive fifteen minute blocks is determined for, say, the period of time extending from 0700 to 0900 (i.e., for a period of time of one hundred and twenty minutes) then at 0900 the heavy temperature average is calculated by adding together the average temperature for each of the eight immediately preceding fifteen minute blocks and dividing by eight. The eight fifteen minute blocks immediately preceding 0900 ended at 0715, 0730, 0745, 0800, 0815, 0830, 0845, and 0900. The next heavy temperature average is calculated at 0915 by using the average temperature for each of the eight fifteen minute blocks immediately preceding 0915. The eight fifteen minute blocks immediately preceding 0915 ended at 0730, 0745, 0800, 0815, 0830, 0845, 0900, and 0915. In other words, when the average heavy temperature is next calculated at 0915, the oldest block of averages (i.e., the block of averages determined for the fifteen minutes extending from 0700 to 0714 is dropped).

What is important in the practice of the invention is that some method be selected to calculate the heavy temperature average during a period of time which is longer than the period of time used to calculate the light temperature average. One of the procedures noted above can be utilized, as can any other desired procedure which calculates a heavy temperature average during the selected period of time.

In the graph of FIG. 2, the distance between the light temperature average line 12 and the heavy temperature average line 13 can usually be increased by increasing, while maintaining the length of the time period utilized to calculate a light temperature average, the length of the time period utilized to calculate the heavy temperature average. Or, the distance between the light temperature average line 12 and the heavy temperature average line 13 can usually be increased by decreasing, while maintaining the length of the time period utilized to calculate a heavy temperature average, the length of the time period utilized to calculate the light temperature average.

On the left side of the graph of FIG. 2, an up trend occurs when the light temperature average is greater than the heavy temperature average. On the right side of the graph of FIG. 2, a down trend occurs when the light temperature average is less than the heavy temperature average.

Figure 3:
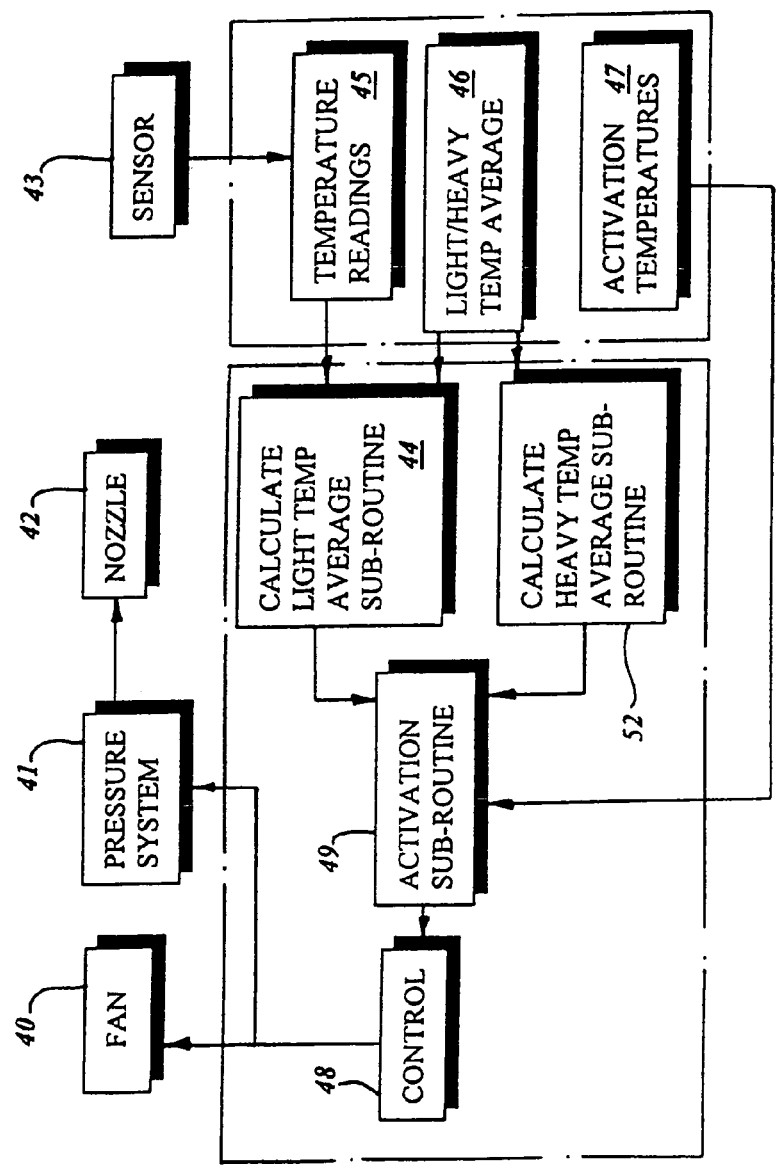
FIG. 3 is a block diagram illustrating the mode of operation of the evaporative apparatus of the invention.

The control system utilized to turn the evaporative cooling apparatus of FIG. 2 on and off is illustrated in FIG. 3 and includes a controller, memory, and temperature sensor 43.

The memory includes temperature readings 45 from sensor 43, light and heavy temperature averages 46, and the activation temperatures 47 for turning the evaporative cooling apparatus on and off.

The controller includes the calculate light temperature average sub-routine 44, calculate heavy temperature average sub-routine 50, and activation sub-routine 49.

Sensor 43 determines the ambient air temperature at selected intervals, for example, every minute, and transmits ambient air temperature data to the temperature reading 45 portion of the memory. The calculated light temperature average sub-routine 44 utilizes the temperature readings stored in temperature readings 45 to calculate light temperature averages at selected intervals—for example, every minute—to produce data like that shown in Table I above. The light temperature averages calculated by sub-routine 44 are stored in light/heavy temperatures 46 portion of the memory. The calculated heavy temperature average sub-routine 50 utilizes the temperature readings stored in temperature readings 45 to calculate heavy temperature averages at selected intervals— for example, every fifteen minutes—to produce data like that shown in Table II above. The heavy temperature averages calculated by sub-routine 50 are stored in light/heavy temperatures 46 portion of the memory. There is an up trend when the light temperature average is greater than the heavy temperature average.

The activation temperatures 47 portion of the memory includes the temperature at which the apparatus of FIGS. 1 and 3 is turned on and the temperature at which the apparatus of FIGS. 1 and 3 is turned off. The "turn on" temperature can equal the "turn off" temperature, but these two temperatures typically are different.

The "turn on" point occurs when the light temperature average equals or is greater than the selected set point (turn on) temperature and when there is an up trend. The "turn off" point occurs when the light temperature average equals or is less than the selected set point (turn off) temperature and when there is a down trend.

If the "turn on" temperature is 80° F., controller 40 turns on the fan motor 14 when there is in an up trend and the light temperature average is 80° F. or greater. The pressure system 41 is typically turned on after the fan and currently cycles through twelve stages which each increase the volume of water emitted by nozzle 27.

If desired, the heavy temperature average can be used instead of the light temperature average to turn the system on and off. For example, the "turn on" temperature occur when the heavy temperature average equals a selected set point temperature and when there is an up trend.

The "turn on" and "turn off" temperatures usually differ but may be the same.

The activation sub-routine 49 utilizes the light/heavy temperatures stored in portion 46 of the memory and utilizes the activation temperatures stored in portion 47 of the memory in order to determine when to generate a signal to control 48 so that control 48 sends commands to fan 40 and pressure system 41, respectively, to turn the fan and pressure system on or off. Activation sub-routine 49 determines that there is an up trend when, as noted above, the light temperature average is greater than the heavy temperature average.

When activation sub-routine 48 determines there is an up trend (as is the case on the left hand side of the graph of FIG. 1), it monitors the light temperature average (or the heavy temperature average, as the case may be) to determine when the light temperature average (or the heavy temperature average) is equal to or greater than the selected "turn-on" set point temperature stored in activation temperatures 47 portion of the memory. When the light temperature average calculated by the sub-routine 50 is equal to or greater than the selected "turn-on" set point temperature stored in memory portion 46, and when there is in an up trend, the activation sub-routine 49 generates an activation signal to control 48, and control 48 generates commands to fan 40 which causes fan motor 14 to turn on and the fan blades 18, 19 to produce an airflow which will carry any droplets emitted from nozzle 27 due to operation of pressure system 41 in the general direction indicated by arrows C in FIG. 1.

Similarly, when activation sub-routine 49 determines there is a down trend (as is the case on the right hand side of the graph of FIG. 2), sub-routine 49 monitors the light temperature average (or the heavy temperature average) to determine when the light temperature average (or heavy temperature average) is equal to or less than the selected "turn-off" set point temperature average stored in activation temperatures 47 portion of the memory. When the light temperature average calculated by the sub-routine 50 is equal to or less than the selected "turn-off" set point temperature average stored in memory portion 47, the activation sub-routine 49 generates an activation signal to control 48, and control generates commands to fan 40 and pressure system 41 which causes fan 40 to turn off such that fan 40 does not produce an airflow which will carry any droplets emitted from nozzle 27 in the general direction indicated by arrows C in FIG. 1.

In an uptrend, if desired, the activation sub-routine 49 (or sub-routine 50) can be programmed to subtract one or two degrees F.—or more—from each light temperature average calculated by sub-routine 50 so that before control turns on fan 40 and pressure system 41 the light temperature average has to actually rise to be one or two degrees F. higher than the selected "turn on" set point temperature average entered in the activation temperatures 47 portion of the memory.

Similarly, sub-routine 50 can be programmed to utilize earlier temperature readings when calculating the light temperature average. For example, in Table I, instead of at 0714 utilizing the five ambient temperature readings (listed in the second column of Table I) from 0710 to 0714 to calculate the "actual" light temperature average, the five ambient temperature readings (listed in the second column of Table I) from 0708 to 0712 can be utilized to produce a "delayed" light temperature average. The "delayed" light temperature average would be 69.0 at 0714 instead of the "actual" light temperature average of 70.2° F. noted in Table I. Fan 40 and system 41 would not be turned on until the "delayed" light temperature average equaled the "turn on" set point temperature average stored in activation temperatures 47. If, for example, the selected "turn on" set point temperature stored in activation temperatures 47 was 80° F., the practical effect of utilizing a "delayed" light temperature average would, in this example, therefore be to delay the turn-on of fan 40 and pressure system 41 until the "actual" light temperature average was about a degree greater than 80° F.

When a cold weather front or a warm weather front passes through, such a front usually causes a fairly rapid temperature change and does not cause the cycling problem often experienced by prior art evaporative cooling apparatus during turn-on in the morning and turn-off in the afternoon.

As would be appreciated by those of skill in the art, a principal used of the apparatus of FIGS. 1 and 3 is to produce evaporatively cooled air which helps maintain a relatively constant air temperature around a dairy cow. The apparatus is mounted above and directs evaporatively cooled air downwardly toward a dairy cow standing beneath the apparatus. The evaporative cooling apparatus of the invention can, however, be utilized in any other desired application.

Figure 4:
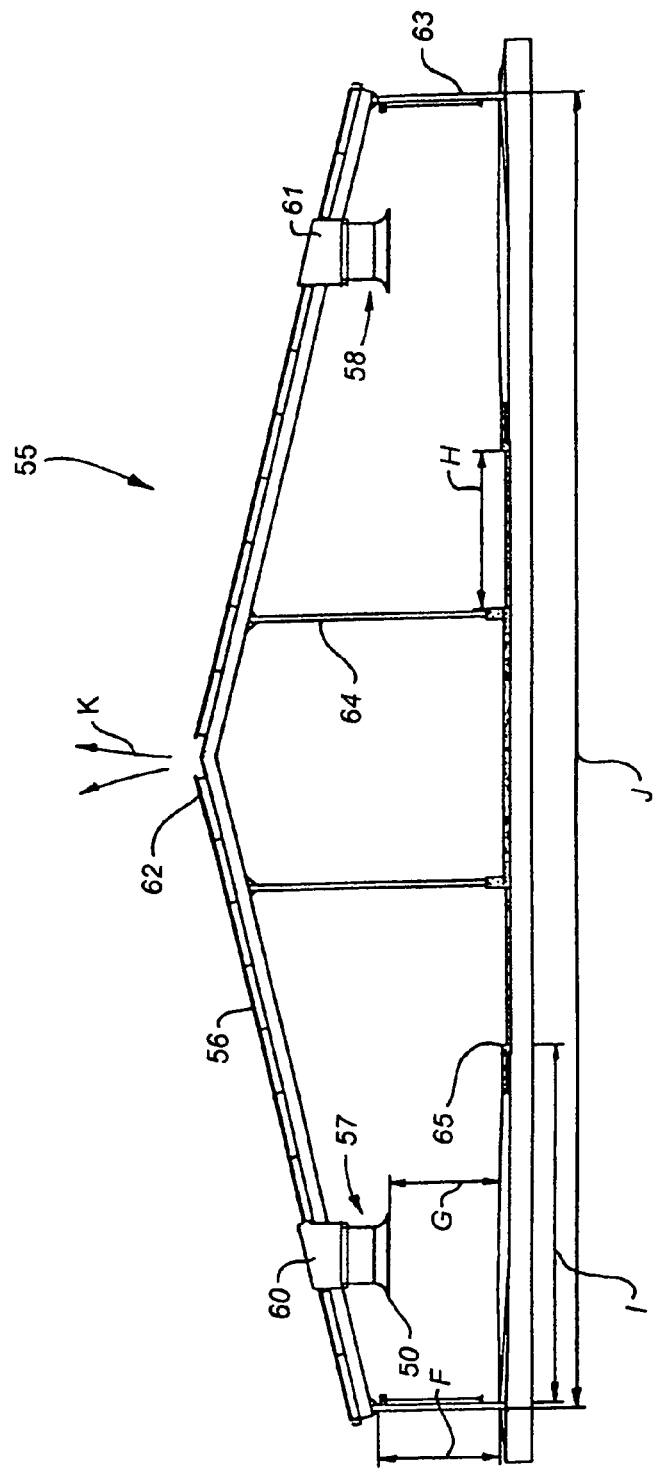
FIG. 4 is a side elevation view illustrating a cooling system constructed in accordance with an alternate embodiment of the invention.

FIG. 4 illustrates an alternate embodiment of the invention including a building 55. FIG. 4 is an end elevation view of building 55. Building 55 includes a sloped roof 56 with at least one peak 62. Warm air rises upwardly toward the peak 62 and exits in the directions indicated by arrows K through a ventilation opening or openings (not shown) positioned near or adjacent the peak 62. The slope of roof 56 ordinarily is in the range of 1.50:12 (i.e., the roof rises—or falls—1.75 inches over each twelve inch lateral horizontal span of the roof) to 4:12.

The width of building 55, indicated by arrows J, can vary as desired but usually is at least seventy feet, typically about one hundred feet or more, but less than two hundred feet. The height of the sides of building 55 indicated by arrows F, can vary as desired, but usually is at least eight feet, typically about nine feet, but less than twenty feet.

In some instances, only half of building 55 is constructed. Such a "half-building" construction includes only one-half the roof illustrated in FIG. 4, which means that the roof on a "half-building" construction has only a single slope. In contrast, the roof of building 55 has two slopes; a different slope for each half of the roof. The width of a "half-building" construction is at least thirty feet, typically about fifty feet or more, but less than one hundred feet.

Each unit 57, 58 is equivalent to the evaporative cooling unit illustrated in FIG. 1 and is suspended from and connected to roof 56 by a duct structure 60, 61, respectively. The distance of the bottom edge 50 of each unit 57, 58 above the ground or floor of building 55 is indicated by arrows G and is presently eight and a half feet. Distance G can vary as desired but is usually in the range of six to ten feet, preferably about eight and a half feet. If desired, units 57, 58 can be connected directly to roof 56 without using a duct structure 60, 61 which extends between each unit 57, 58 and roof 56.

Arrows I indicate the width or depth of a stall in building 55. This width can vary as desired but is presently about twenty-seven feet.

Arrows H indicate the distance from a stall edge 65 to a vertical support beam 64. This distance can vary as desired but presently is about twelve feet.

A problem associated with large buildings of the type 55 (or with the "half-buildings" with a single slope roof described above) shown in FIG. 4 is that air inside the building tends to stagnate. This occurs even though the building's roof is intentionally sloped to encourage warm air to rise upwardly to peak 62 and out through ventilation openings formed in roof 56. An additional problem is that the tendency of air to rise upwardly from the ground toward roof 56 can interfere with operation of evaporative cooling apparatus of the general type set forth in FIG. 1. This interference occurs because during the normal operation of apparatus of the type illustrated in FIG. 1, air spirals downwardly in the manner indicated by arrow C. This downward movement of air is, however, offset by air that rises from the floor of building 55 and travels upwardly toward peak 62. Such rising air tends to amplify the natural tendency of air to rise upwardly in the direction indicated by arrows D. Also, when breeze travels over the top of the roof 56, a pressure differential is created which tends to draw air from inside the building out through the peak 62 in the direction of arrow K. This pressure differential also tends to draw air upwardly into and through housing 71 toward roof 56 in the direction of travel indicated by arrows D in FIG. 1.

In order to offset the problems noted above in connection with large buildings 55, the apparatus of FIG. 1 is provided (1) with conical tapered member 25 that functions to increase the rate at which air exits member 25 and flows downwardly toward the ground, (2) with a fan blade having a diameter in the range of thirty to one hundred inches to increase to volume of air flowing downwardly toward the ground, (3) with an upper cylindrical cowling ring 51 which does not extend from the inside of the cylindrical housing 71 outwardly toward the ends of blades 18 and 19, but which instead extends upwardly from the upper edge of housing 71 to that the outer ends of blades 18 and 19 can be positioned closer to the inner cylindrical surface of housing 71, and (4) to increase the efficiency of operation of the fan, with fan blades 18, 19 having outer ends that are spaced apart only one-eighth to one and one-quarter inch from the inside cylindrical wall of housing 71. In addition, the lower edge or lip 50 is positioned the desired distance G above the ground by using, if necessary, a duct extension 60 to space the evaporative cooling unit of FIG. 1 a desired distance below roof 56.

The embodiment of the invention illustrated in FIGS. 5 and 6 includes hollow cylindrical housing 71A with an upper cowling 51A and a lower cowling 50A. A fan mounted inside the upper portion of housing 71A includes hub 72 and blades 18A and 19A extending outwardly from hub 72. Hollow conical duct 25A is mounted inside housing 71A. Airflow guide 70 is mounted beneath hub 72 and is generally laterally centered in housing 71A. The structural members utilized to mount the fan, the airflow guide 70, and the hollow conical duct 25A are omitted from FIG. 5 for sake of clarity, but can be comparable to the structural members illustrated in FIG. 1 or can take on any other desired shape and dimension and arrangement.

At least a portion of the arcuate outer surface 74 of airflow guide 70 preferably, but not necessarily, tapers from top to bottom.

When the fan is operating and blades 18A, 19A are rotating, air downwardly displaced by the inner portions of blades 18A, 19A travels between guide 70 and the inner conical surface 73 toward circular opening 77 at the bottom of conical member 25A. Airflow guide 70 functions to occupy space beneath hub 72 and to channel airflow from blades 18A, 19A between guide 70 and surface 73.

At the top edge 29A of member 25A, the space between guide 70 and surface 73 is doughnut shaped. The cross-sectional area of doughnut-shaped space 76 is visible in FIG. 6. At the lower edge 28A of member 25A, the cross-sectional area 77 is circular. The ratio of the cross-sectional area of doughnut-shaped space 76 with respect to the cross-sectional area of circular space 77 is in the range of 0.75:1 to 1.9:1, preferably 1.1:1 to 1.7:1. The cross-sectional area of space 76 is preferably greater than the cross-sectional area of space 77 because member 25A then tends to function like a venturi and to increase the rate at which air from blades 18A, 19A flows downwardly through area 77. Even when, however, the ratio of the cross-sectional area of space 76 to the cross-sectional area of space 77 is in the range of 0.75:1 to 1:1, tapered member 75 tends to function to insure that air from the fan flows downwardly through area 77 toward the ground in the direction of arrow V and does not flow upwardly through area 77 into member 25A. Consequently, member 25A tends to stabilize air flow from member 25A downwardly toward the ground.

By way of example, and not limitation, when the diameter of housing 71A is fifty-two inches, the inner diameter of the circular top edge 29A is two feet, and the inner diameter of the circular bottom edge 28A is eighteen and three-fourths inches. The height Q of member 25A is eighteen inches. The height of guide 70 is twelve inches. The diameter of the top 71 of guide 70 is twelve inches. The diameter of hub 72 is twelve inches.

When the diameter of housing 71A is sixty inches, the inner diameter of the circular top edge 29A is two feet, seven inches; and, the inner diameter of the circular bottom edge 28A is twenty inches. The height Q of member 25A is eighteen inches. The height of guide 70 is twelve inches. The diameter of the top 71 of guide 70 is eighteen inches. The diameter of hub 72 is eighteen inches.

When the diameter of housing 71A is seventy-two inches, the inner diameter of the circular top edge 29A is thirty-four and one half inches; and the inner diameter of the circular bottom edge 28A is twenty-three and one-half inches. The height Q of member 25A is eighteen inches. The height of guide 70 is twelve inches. The diameter of the top 71 of guide 70 is twenty-one inches. The diameter of hub 72 is twenty-one inches.

It is preferred that air traveling downwardly through member move through a tapered doughnut shaped flow path or channel (1) between surface 73 and guide 70, and (2) between surface 73 and the central conical space represented by dashed lines 80 and 81. Guide 70 functions to fill up space on the interior of this tapered doughnut shape path to prevent air from traveling inwardly into the area occupied by guide 70. The conically shaped "dead" space represented by dashed lines 80 and 81 directly beneath guide 70 is also on the interior of the desired tapered doughnut shaped flow path and is not occupied by the guide 70 illustrated in FIG. 5. If desired, it is possible to shape guide 70 to also occupy this space so that some of the air traveling downwardly toward opening 77 can not drift into this dead space.

When the volume of the space occupied by guide 70 is added to the volume of the conically shaped dead space 80, 81 beneath guide 70 in FIG. 5 to obtain a total inner volume for the space which is interior of the desired tapered doughnut shaped flow path, it is preferred that the volume occupied by guide 70 be 60% to 95% of said total inner volume, most preferably 75% to 90% of the total inner volume. It is important that guide 70 occupy a sizeable portion of the total volume to insure that air flowing downwardly into member 25A from the fan will be channeled along the desired doughnut shaped tapering path and will not drift inwardly away from inner surface or wall 73.

An alternate embodiment of the invention is illustrated in FIGS. 7 to 12 and is primarily intended for use in ambient air in or adjacent residential homes and other building structures and out-of-doors locations inhabited or used by human beings, although this embodiment of the invention can also be used to cool areas frequented by animals.

Figure 7:
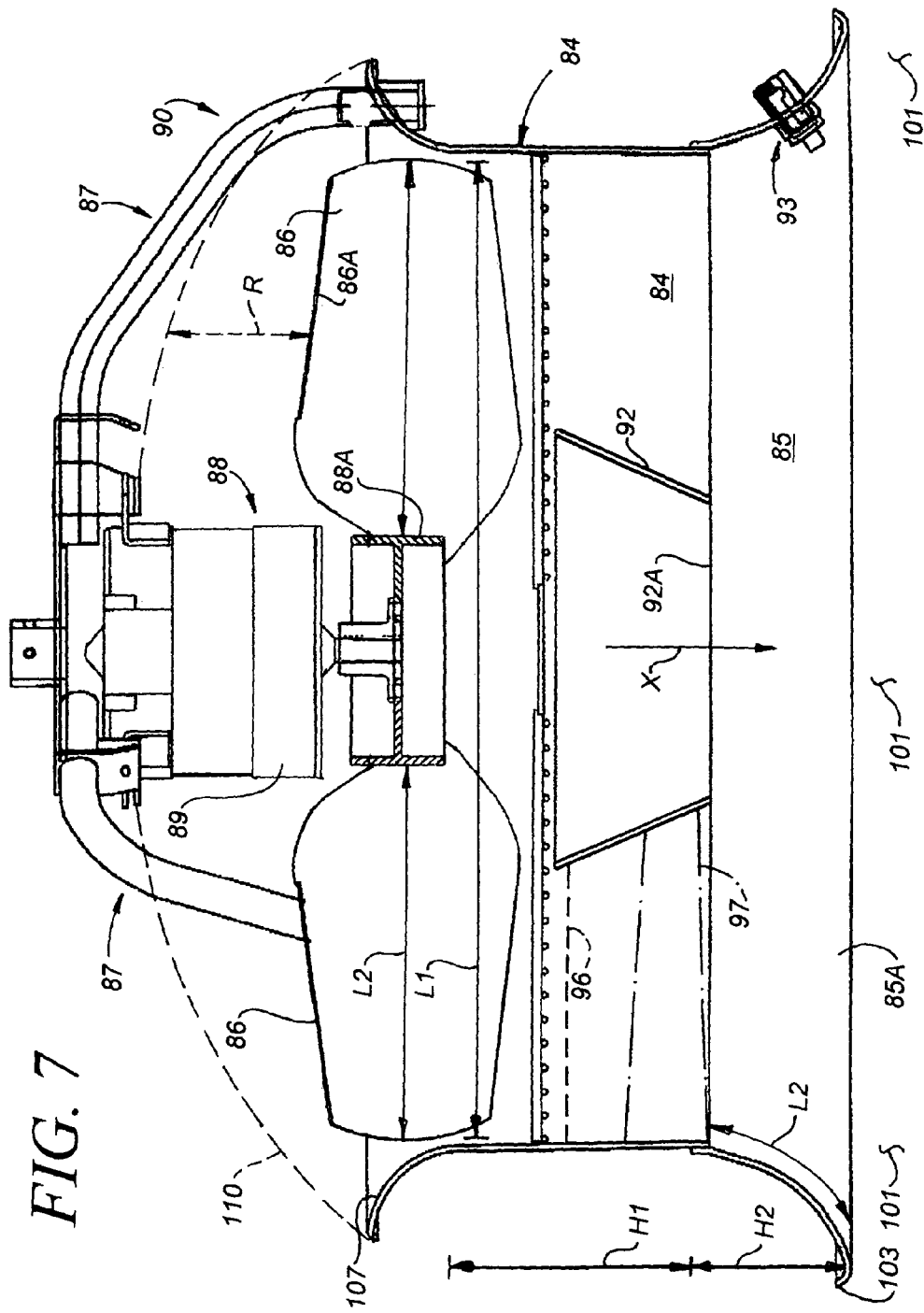
FIG. 7 is a side section view illustrating an evaporative cooling unit constructed in accordance with an alternate embodiment of the invention.
Figure 8:
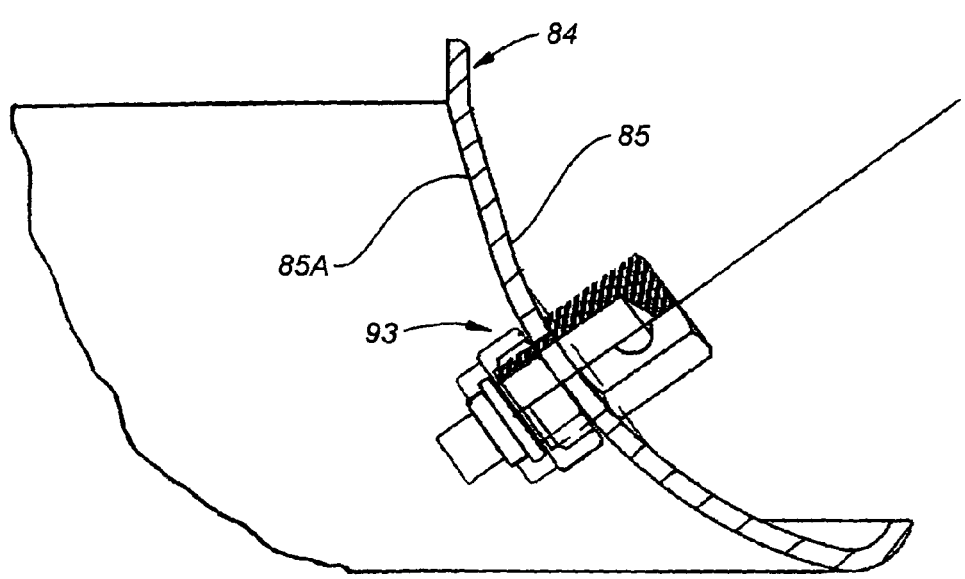
FIG. 8 is a side section view illustrating a portion of the unit of FIG. 7 with a spray nozzle installed therein.
Figure 9:
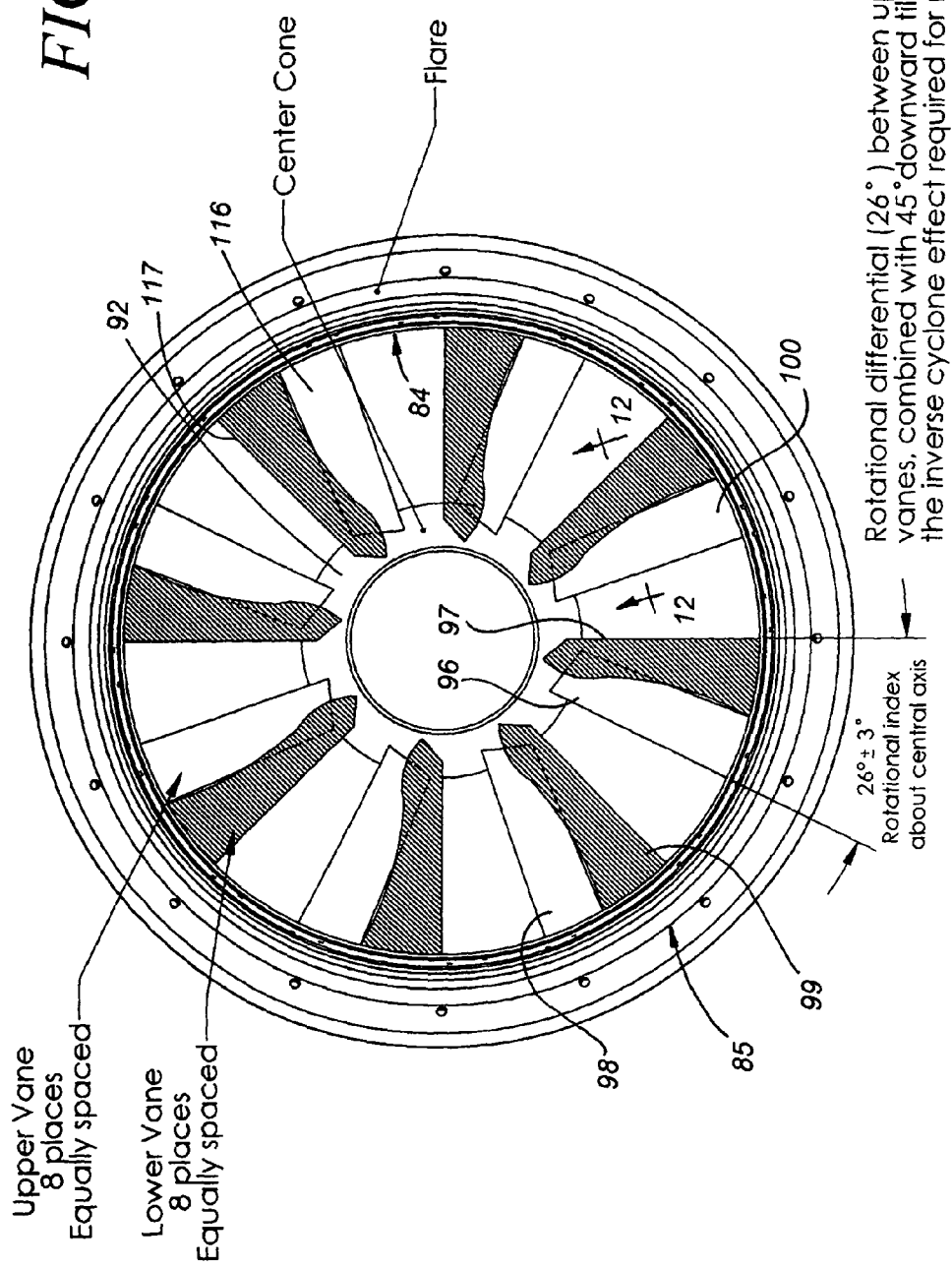
FIG. 9 is a bottom view illustrating the directional vanes in the unit of FIG. 7.
Figure 10:
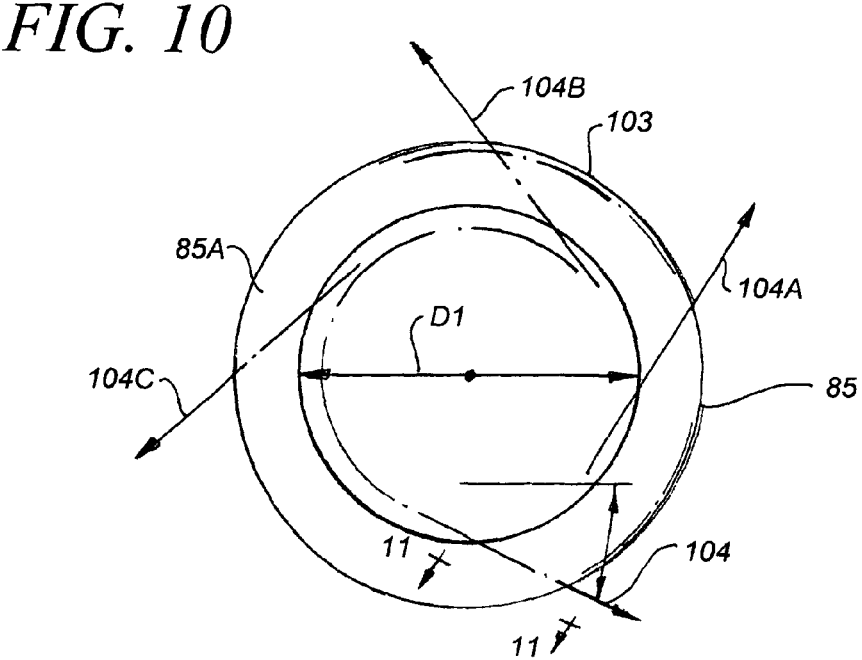
FIG. 10 is a bottom view of the unit of FIG. 7 illustrating the flow of air therein.
Figure 11:
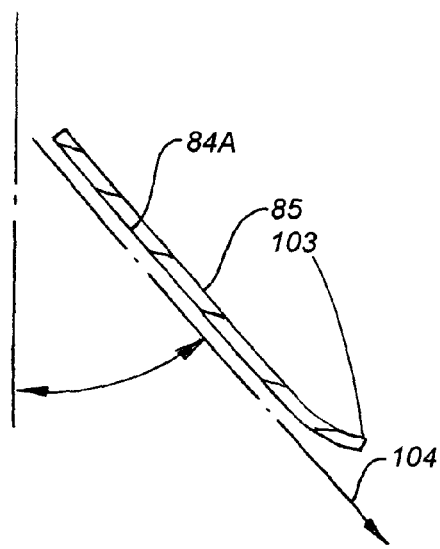
FIG. 11 is a section view of a portion of the unit of FIG. 10 illustrating the linear tangential flow of air and taken along section lines 11-11.

The evaporative cooling unit illustrated in FIG. 1 typically is large, has a diameter of fifty to seventy-two inches, and is intended for use in dairy barns and other large structures. The evaporative cooling unit 90 of FIG. 7 is much smaller. The diameter D1 of cylindrical housing 84 ordinarily is in the range of fifteen to thirty-six inches and is presently preferably about twenty inches. When the diameter D1 becomes smaller, it is more difficult to cause the helical flow of evaporatively cooled air to expand as it exits downwardly past the flared lip 85, hereafter termed the "flare" 85, of the cooling unit 90, and to develop a centrally located updraft of the type indicated in FIG. 1 by arrows D. In the smaller cooler of FIG. 7, instead of expanding outwardly as it leaves the cooling unit, the cooled air has a tendency to move straight down. When the cooled air moves straight down, the area cooled by the fan is restricted and a centrally located updraft is not produced. This is undesirable.

One reason the helical flow of air tends to not move outwardly after it downwardly exits unit 90 is that the flow of cooled air from unit 90 contacts or "runs into" ambient air that resides below the cooling unit 90. The ambient air functions to retard or prevent the outward flow of air. Further, cooled air flowing downwardly out from housing 84 past the flare 85 creates a low pressure area that is immediately adjacent the path of travel of the cooled air. This low pressure tends to draw in ambient air and to further interfere with the desired outward lateral flow of cooled air.

A second reason the helical flow of cooled air tends to not move outwardly after it travels downwardly past flare 85 is that the size of fan blade 86 decreases concomitantly with the decrease in diameter D1 of housing 84. Smaller fans "push" less air, making the outward flow of air from flare 85 easier to disrupt. As described below, the evaporative cooling unit 90 of FIGS. 7 to 12 is designed to overcome these problems.

Unit 90 includes housing 84 mounted on tubular frame 87. Fan 88 is also mounted on tubular frame 87 and includes at least one blade 86 rotated by motor 89. Motor 89 is powered by electricity, hydraulic power, or any other desired motive power. The pitch of blades 86 can vary as desired, but preferably is in the range of thirty degrees to fifty degrees, most preferably in the range of thirty-five to forty-five degrees. The pitch of blades 86 is presently forty degrees.

The height H1 of cylindrical housing 84 is preferably in the range of two inches to thirty-four inches, preferably three inches to fifteen inches, and is presently about four and a half inches. The height H2 of the flare 85 is preferably in the range of one and a half to five inches, and is presently about three inches.

The "tip-to-tip" length L1 of the fan blades is slightly less than the diameter D1 of housing 84. Consequently, the length L1 is preferably in the range of about fifteen to thirty-six inches. The RPM of the fan blades is preferably in the range of about 550 to 1200 rpm. The pitch of the fan blades 86 determines the angle (from vertical) at which air travels "off" and away from the blades 86 when blades 86 are rotating. When the pitch of the blades is forty degrees, air travels downwardly away from the blade at angles from vertical in the range of about twenty to forty-five degrees, and typically averages an angle of about twenty degrees to thirty degrees.

Figure 12:
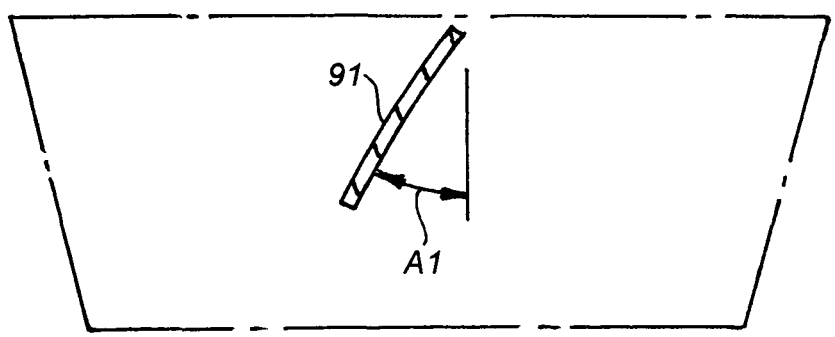
FIG. 12 is a side section view of a portion of a vane in the unit of FIG. 7 illustrating the general orientation of the vane.
Figure 16:
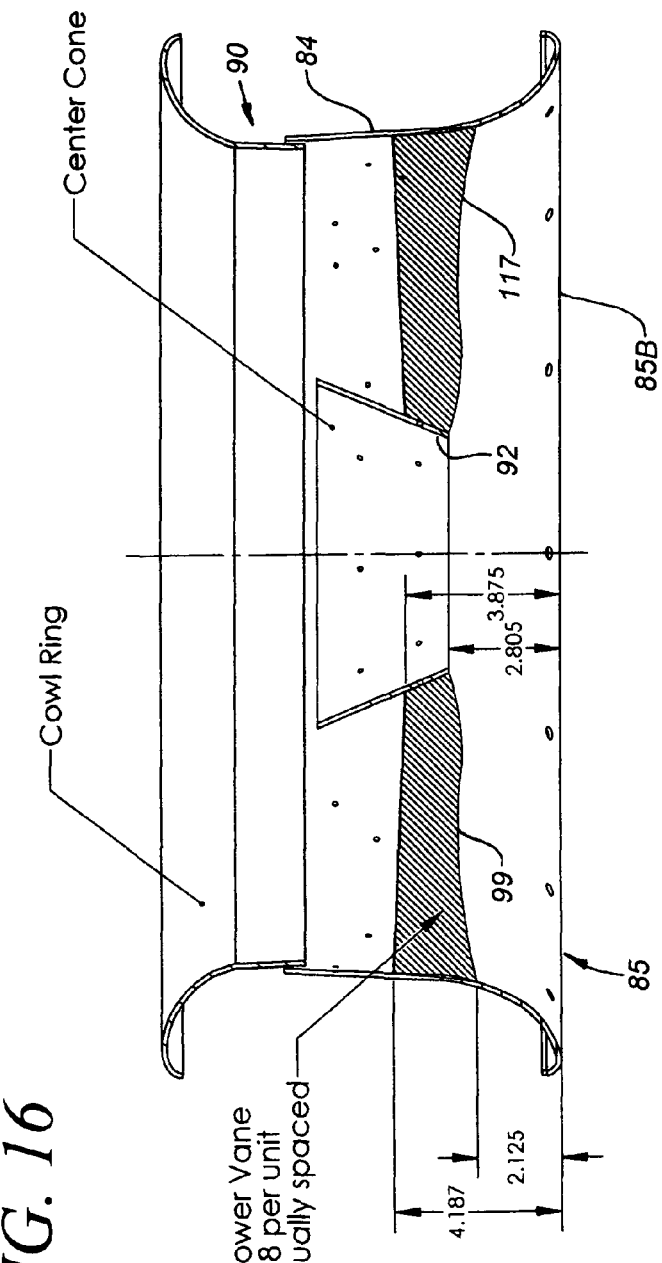
FIG. 16 is a side section view of the unit of FIG. 7 illustrating vanes on the lower tier of vanes in the unit.

Vanes 96 to 100, 116, 117 (FIGS. 9, 16, 17) function to receive air from rotating blades 86 and to stabilize and deflect outwardly the helical flow of air such that the air presently travels downwardly from the vanes at an angle of forty-three to forty-eight degrees from vertical. Each vane is, as illustrated in FIG. 12, oriented at an angle A1 from the vertical. This angle A1 is presently preferably forty-five degrees. Angle A1 can, however, be in the range of forty to fifty degrees, preferably forty-three to forty-eight degrees. It is important that the angle of the vanes be within ten to twenty degrees, preferably fifteen to eighteen degrees of the average angle of air flow off fan blade 86. If the differential between the average angle of airflow off the fan blades and the angle of the vanes is too great, the vanes will tend to block the flow of air and will tend to be ineffective at deflecting air flow along a path that laterally displaces the air. In larger coolers having a diameter in the range of fifty to sixty inches, the top tier of vanes is canted at an angle from the vertical of about thirty-five degrees. This angle is not practical for the smaller cooler described with reference to FIGS. 7 to 18.

There are two tiers of vanes. A first upper tier 96, 98, 100, 116 that is closer to fan blades 86 and a second tier 97, 99, 117 that is closer to flare 85 and further from blades 86. Larger cooler units having a diameter in the range of fifty to seventy-two inches typically utilize three tiers of vanes. Three tiers of vanes will not, practically speaking, function in the smaller cooler described with reference to FIGS. 7 to 18. The vanes are critical in maintaining and producing helical airflow and in laterally deflecting the air flow.

Vanes 96 to 100, 116, 117 each extend between and are connected to hollow conical support member 92 and cylindrical housing 84. One end of each vane is connected to member 92; the other end to housing 84.

Figure 17:
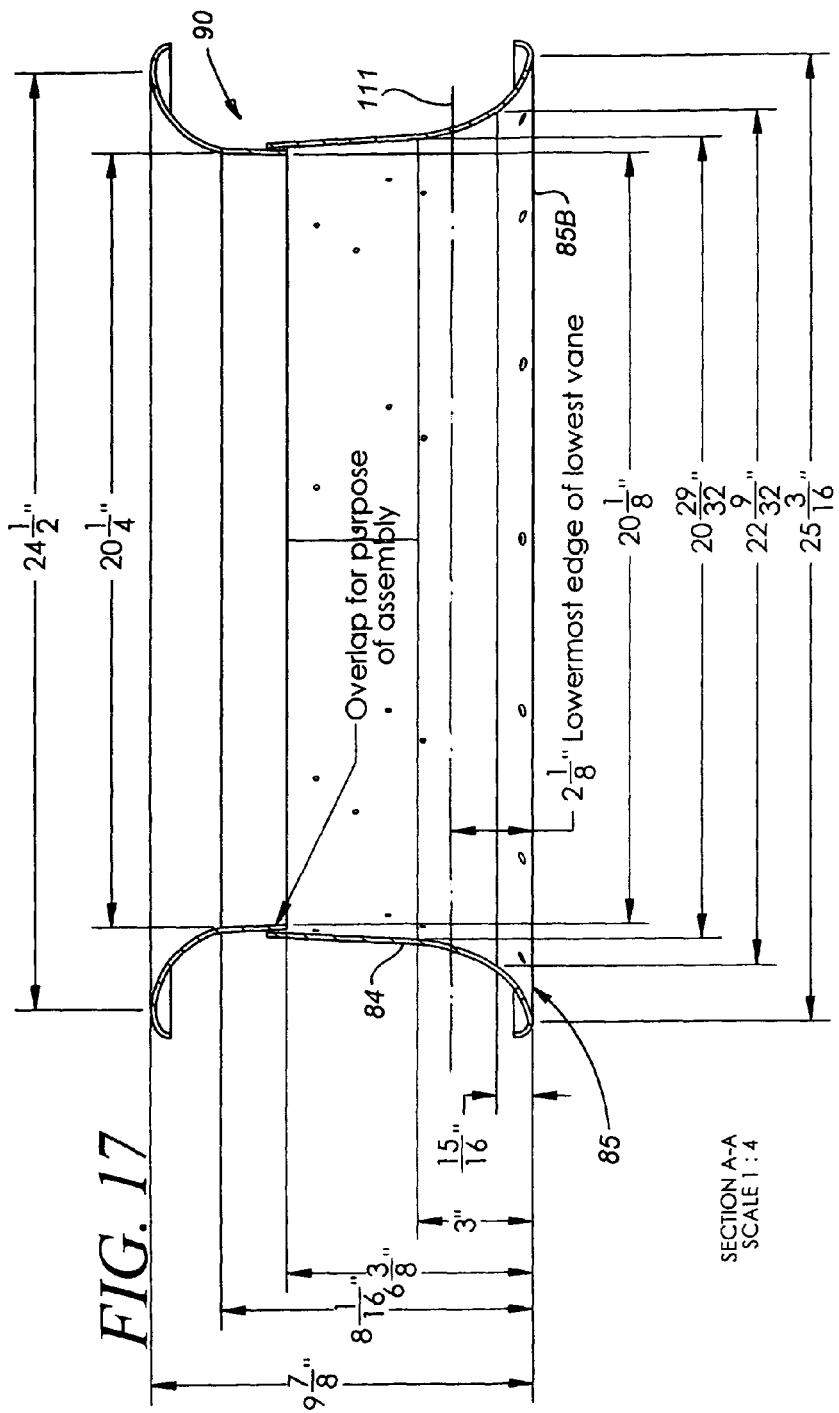
FIG. 17 is a side section view of the unit of FIG. 7 illustrating the distance from the bottom of the flare to the lowermost point on the lowermost edge of the lowest vane in the lower tier of vanes in the unit; and, FIG. 18 is a side section view of the unit of FIG. 17 illustrating the radii of curvature of the flare of the unit.

In FIG. 17, dashed line 17 indicates the vertical location of the lowermost edge of the lowest vane mounted in the housing of the cooler. The distance from this lowermost point to the lowest point, or bottom, of the flare is two and one-eighth inches and is preferably in the range of one and one-half to six inches. In contrast, in larger coolers having a diameter in the range of fifty to seventy-two inches, the distance from the lowermost point on the lowermost vane is in the range of thirteen to fifteen inches.

The space from the bottom of cylindrical housing 84 to the bottom of flared lip 85 is termed the transition zone. The flare 85 extends through the transition zone. Ideally, the flare 85 is constructed to foster the outward and downward movement of the helical path of air that is directed by vanes 96 to 100 into the transition zone. A smooth stable transition of air from the bottom of housing 84, through the transition zone, and into the space 101 beneath unit 90 is desirable because it enables the air to expand radially outwardly. A smooth transition is achieved when air from housing 84 expands outwardly and downwardly with minimal turbulence and flow disruption. A smooth transition produces a smooth stable air flow that helps control the updraft toward the center of the unit so that the updraft "turns around" at a location that is below and spaced apart from the lower edge of conical support member 92.

One feature critical to the smooth transition of air through the transition zone is that flare 85 must have an arcuate, or curved, cross-section as illustrated in FIG. 7. A conical shape is not preferred for flare 85 because the cross-section of flare 85 would, instead of being arcuate, be a straight edge.

A second feature critical to the smooth transition of air from housing 84 into the ambient air in space 101 is that flare 85 must have a sufficient length L2. Length L2 is preferably about nine inches (for a housing having a twenty inch diameter) and is preferably in the range of six to fourteen inches. If the length L2 is too short, the air exiting from housing 84 does not have sufficient time and space in which to make a smooth transition. Length L2 increases as the diameter of housing 84 increases.

A third feature critical to the smooth transition of air from housing 84 into the ambient air in space 101 is that the curvature of the inner convex surface 85A of flare 85 must permit air to travel radially outwardly tangentially over the surface along lines of travel 104 that are substantially linear or nearly linear. Consequently, when air travels radially outwardly over inner convex surface 85A in the manner illustrated in FIG. 10, air is traveling over points on convex surface 85A that tend to lie along a line or flat surface in the manner illustrated in FIG. 11. Such radial linear travel of air in the direction of arrows 104, 104A, 104B, 104C, etc. facilitates the outward radial tangential distribution of air from unit 90. The optimal curvature of convex surface 85A will vary depending on the angle at which air is downwardly helically traveling when the air enters the transition zone. As would be appreciated by those of skill in the art, the curvature of surface 85A can not be too great, because it does not provide the air flow sufficient time and space in which to transition radially tangentially outwardly. Similarly, if the curvature of surface 85A is not great enough, surface 85A will prevent the air from traveling outwardly.

Also, changes in curvature of convex surface 85A are gradual. The curvature of surface 85A does not suddenly change from a relatively flat curvature to a sharp curvature like that of a circle with a diameter of one half-inch. FIG. 7 provides a relatively accurate representation of curvature of surface 85A is the presently preferred unit 90 of the invention, as does FIG. 18. It is important that the radius of curvature of the flare 85 gradually decrease from top to bottom. Consequently, in FIG. 18 near the top of flare 85 the radius of curvature is 4.874 inches. From the that area near the top of flare 52 downwardly, the radius of curvature gradually decreases until near the bottom of flare 85 the radius of curvature is 2.249 inches. Over substantially the entire length L2 (FIG. 7) of arcuate flare 85, the radius of curvature preferably decreases from a value near the top of flare 85 which is in the range of four to six inches to a value near the bottom of flare 85 which is in the range of one and one-half to three inches.

Flare 85 includes a lower peripheral upturned edge 103. The lower surface of upturned edge 103 is not considered a part of convex inner surface 85A. The smooth arcuate transition between the lower surface of edge 103 and surface 85A does, however, minimize turbulence in air traveling over surface 85A and by the undersurface of edge 103.

Cowling 107 functions to minimize turbulence in air that is drawn into unit 90 by rotating fan blades 86 and that is then downwardly directed by blades 86 into the vane tiers and transition zone.

One or more nozzles 93 is mounted in unit 90 to produce a mist of water or some other fluid. While the position of nozzles 93 can vary as desired, it is presently preferred that they be mounted on flared lip 93 beneath and spaced apart from vanes 96 to 100. Water is supplied to each nozzle 93 at a pressure in the range of forty psi to 1000 psi. The average size of droplet produced by nozzle 93 is in the range of four to seventy microns, preferably fifteen to fifty microns. Nozzle 93 can be mounted on the interior of housing 84. Mounting nozzles 93 on flared lip 85 is, however, simpler, less expensive, and easier to maintenance.

Support member 92 functions to direct an auxiliary air flow by receiving some air produced by blades 86 and directing the air out the lower lip or end 92A toward the center of housing 84 and downwardly toward the ground in the manner indicated by arrow X. This auxiliary air flow out end 92A functions to help prevent air traveling upwardly toward the center of unit 90 in the manner indicated by arrow from flowing into unit 90 and disrupting the helical flow of air and the flow of air through the transition zone. The production by member 92 of this auxiliary air flow is an important function. Member 92 can be cylindrically shaped and need not be conically shaped, but the conical shape is preferred because the air flow produced by the inner portions of blades 86 tends to be relatively weak and a conical member 92 functions somewhat like a venturi and accelerates the flow of air traveling therethrough.

Fan blades 86 are, as noted, presently about 7.625 inches long and can be rotated by motor 89 at different speeds. Blades 86 can rotate at speeds in the range of 500 rpm to 1200 rpm and produce air flow in the range of 2000 to 6000 CFM (cubic feet per minute).

Figure 13:
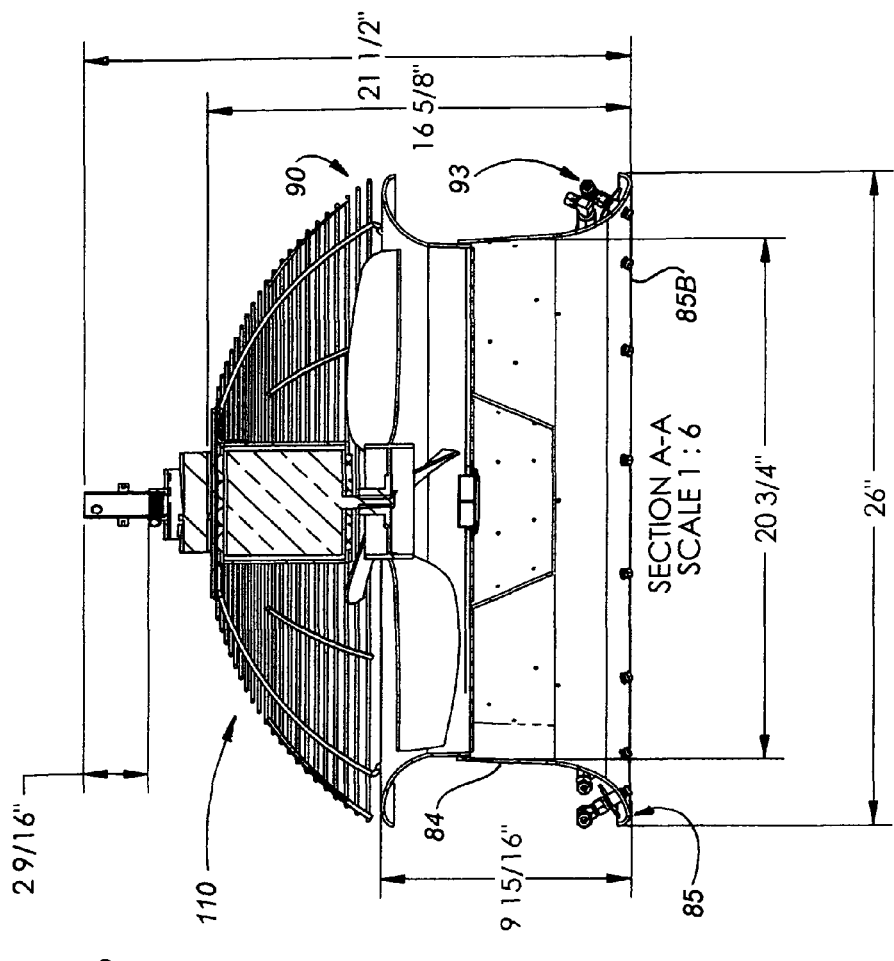
FIG. 13 is a side view of cooler unit of FIG. 7 illustrating the protective grating or screen mounted above the fan in the unit.

Dome shaped protective grate 110 is illustrated in FIGS. 7 and 13. Grate 110 is preferably a distance R (FIG. 7) from the top edge 86A of each fan blade, which distance R averages a distance in the range of two and six inches, preferably a distance equal to or greater than two and one half inches along the length of the edge 86A. The distance between edge 86A and grate 110 is important because if grate 110 is too close to edge 86A, air turbulence produced by grate 110 interferes with the airflow produced by blades 86.

Extensive experimentation was required to develop the cooler described with reference to FIGS. 7 to 18, in large part because long-tested parameters that functioned in large fifty to sixty inch diameter coolers failed when it was attempted to apply such parameters to the smaller cooler of FIGS. 7 to 18. One example of a "large cooler" parameter that failed with respect to the smaller cooler of FIG. 7 is illustrated in FIG. 14.

Figure 14:
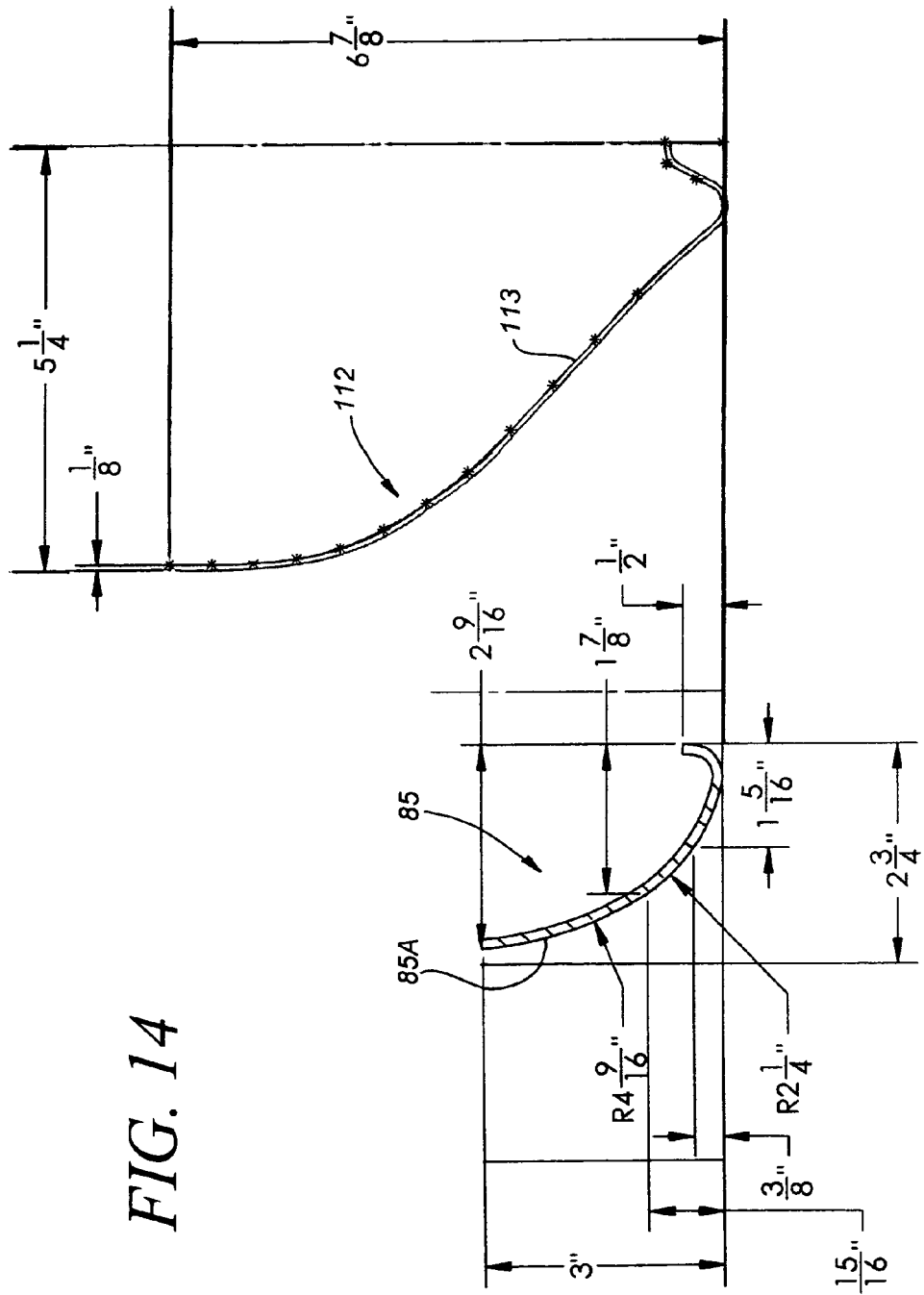
FIG. 14 is a comparison section view of the flare on a small cooling unit constructed in accordance with the invention and of the flare on a large prior art cooling unit.
Figure 15:
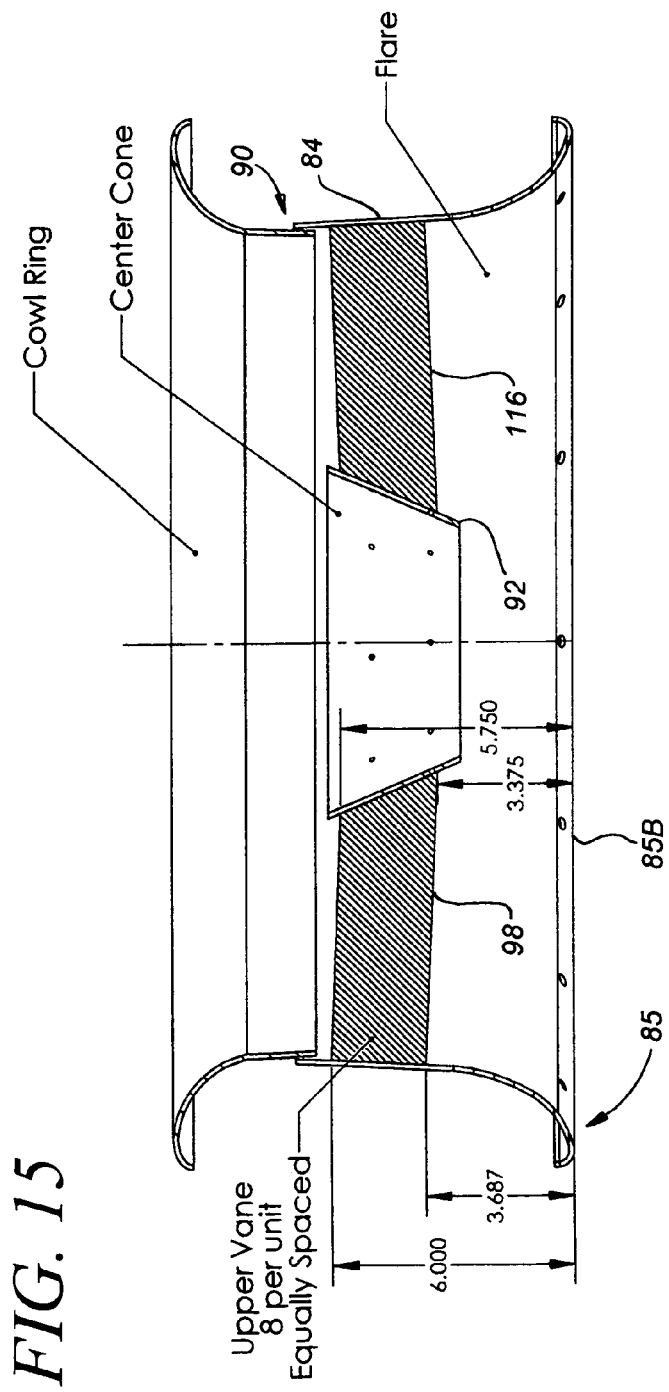
FIG. 15 is a side section view of the unit of FIG. 7 illustrating vanes on the upper tier of vanes in the unit.

FIG. 14 illustrates the flare 85 of a small cooler with respect to the flare 112 of a large cooler. The height of the presently preferred flare 85 for a small cooler is less (only three inches) compared to the height (six and seven-eighths inches) of the flare 112 in a large cooler. More importantly, the flare 112 in a large cooler includes a long section that at first blush appears flat but is actually slightly concave. The flare 112 failed when tested in a small cooler. Instead, flare 85 had to be developed.

Figure 18:
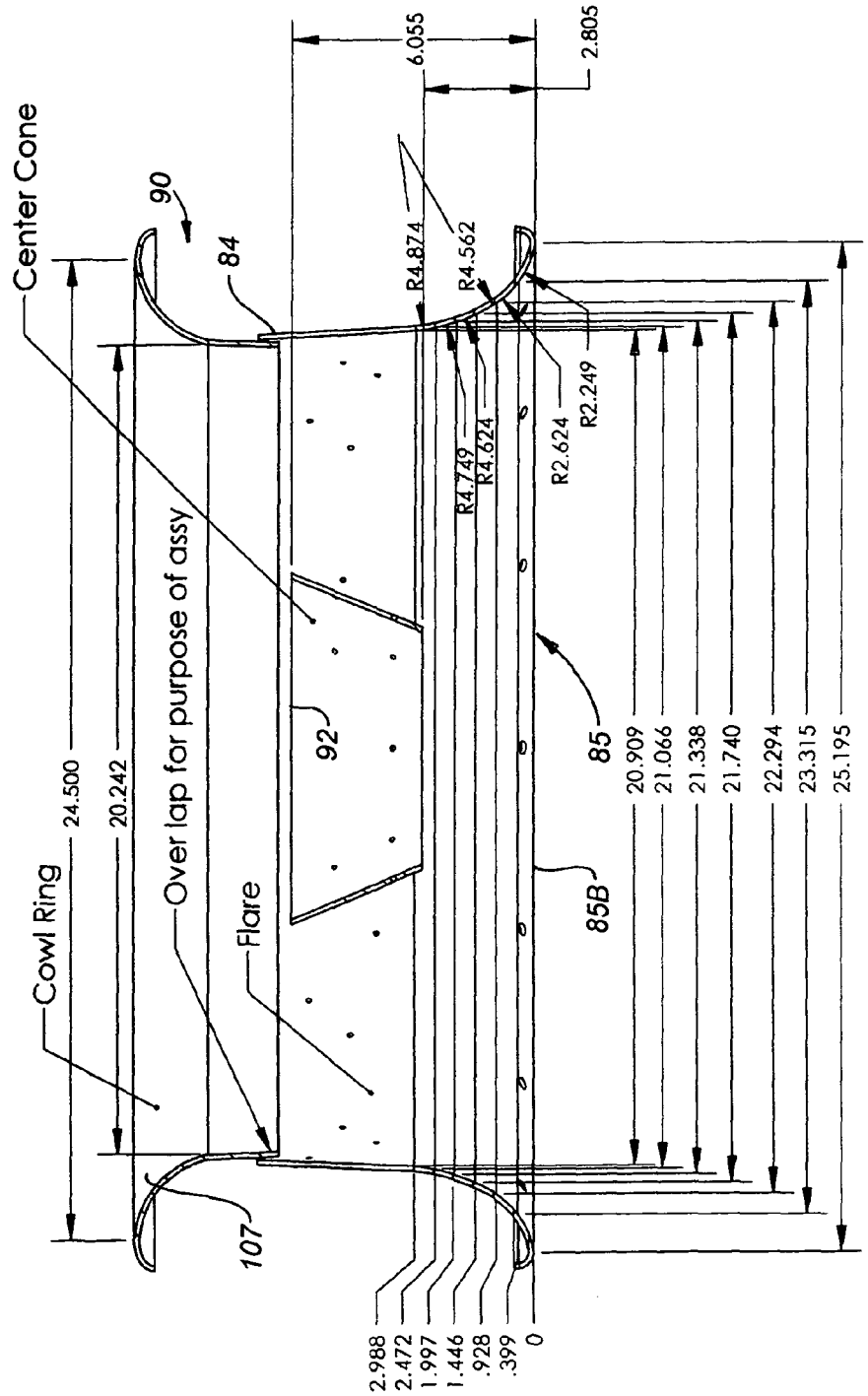

FIG. 18 more specifically illustrates how the convex curvature changes in the presently preferred embodiment of the small cooler as one travels from the top of flare 85 to the bottom edge of flare 85. In particular, as can be seen on the right hand side of the illustration in FIG. 18, at an elevation on the flare 85 between 2.988 and 2.472 inches from the bottom 85B of flare 85, the radius of curvature of the flare is 4.874 inches. At an elevation on the flare 85 between 2.472 and 1.997 inches from the bottom 85B of flare 85, the radius of curvature of the flare is 4.749 inches. At an elevation on the flare 85 between 1.997 inches and 1.446 inches from the bottom 85B of flare 85, the radius of curvature of the flare is 4.624 inches. Thereafter, the radius of curvature of the flare 85 continues to gradually decrease, to 4.562 inches, to 2.624 inches, and finally to 2.249 inches as the flare expands outwardly, i.e. as the diameter of the flare increases. As can be seen in FIG. 18, as the flare expands outwardly, the diameter of the flare increases from 20.909 inches to 21.0066 inches, to 21.338 inches, etc. Accordingly, the radius of curvature pattern of the flare 85 of the cooler of FIG. 18 is very unlike that of the radius of curvature pattern of flare 112 of a large cooler (FIG. 14).

The small cooler of FIG. 7 is typically positioned, or suspended, with the bottom 85B of flare 85 a distance of six to fifteen feet from the ground. As noted, a centrally located updraft of the type indicated by arrows D in FIG. 1 is formed within the helix of air flow that extends and travels from bottom 85B down to the ground. The updraft is located in a central area that is circumscribed by air traveling helically downwardly from the cooler toward the ground. One factor that contributes to the formation of this centrally located updraft is a low pressure area inside housing 84 that functions to draw air upwardly toward housing 84. Another factor that contributes to the formation of this centrally located updraft is a "ground effect" that occurs when some of the air that is in the helix of air flow contacts the ground, is deflected from the ground, and travels upwardly along a path of travel that is centrally located within the helical air flow.

Having set forth our invention and the presently preferred embodiments and uses thereof, we claim:

1. An evaporative cooling unit to be positioned in ambient air and including
   (a) a cylindrical housing having
      (i) a height in the range of two to thirty-four inches,
      (ii) a diameter in the range of fifteen to thirty-six inches,
      (iii) a top, and
      (iv) a bottom,
      said housing circumscribing a central area;
   (b) a fan mounted at the top of said housing to produce a flow of air into said housing;
   (c) a support surface mounted in said central area and spaced apart from said housing;
   (d) a pair of tiers of canted vanes extending from said support surface to said housing to guide said flow of air along a helical path through said housing; and,
   (e) a flare on said bottom of said housing having a variable diameter and a height less than five inches and comprising an outwardly expanding inner convex surface shaped and dimensioned to permit said flow of air to expand helically outwardly tangentially over said inner convex surface and downwardly away from said flare over a generally linear path of travel such that an updraft is formed below said flare and within said path of travel, the radius of curvature of said flare decreasing as said inner convex surface outwardly expands.

* * * * *